(12) United States Patent
Morales et al.

(10) Patent No.: US 11,914,912 B2
(45) Date of Patent: Feb. 27, 2024

(54) HOT FOLDERS WITH ENHANCED PRINT TICKETING FUNCTIONALITY

(71) Applicant: KYOCERA Document Solutions Inc., Osaka (JP)

(72) Inventors: Javier A. Morales, Rochester, NY (US); Atsushi Yamada, Walnut Creek, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/583,487

(22) Filed: Jan. 25, 2022

(65) Prior Publication Data

US 2023/0236783 A1    Jul. 27, 2023

(51) Int. Cl.
*G06F 3/12* (2006.01)

(52) U.S. Cl.
CPC ............ *G06F 3/127* (2013.01); *G06F 3/1205* (2013.01); *G06F 3/1267* (2013.01)

(58) Field of Classification Search
CPC ....... G06F 3/127; G06F 3/1205; G06F 3/1267
See application file for complete search history.

(56) References Cited

U.S. PATENT DOCUMENTS

| | | | | |
|---|---|---|---|---|
| 7,423,776 | B2* | 9/2008 | Murata | H04N 1/2338 |
| | | | | 358/1.15 |
| 8,564,836 | B2* | 10/2013 | Hanawa | H04N 1/00408 |
| | | | | 358/1.9 |
| 8,995,001 | B1* | 3/2015 | Koets | G06F 3/1288 |
| | | | | 358/1.15 |
| 2005/0278619 | A1* | 12/2005 | Kim | G06F 40/186 |
| | | | | 358/1.15 |
| 2012/0162708 | A1* | 6/2012 | Hagiwara | G06F 3/1208 |
| | | | | 358/1.15 |
| 2014/0160527 | A1* | 6/2014 | Banner | G06F 3/1262 |
| | | | | 358/1.15 |
| 2015/0046207 | A1* | 2/2015 | Hurd | G06Q 10/06313 |
| | | | | 705/7.17 |
| 2016/0266851 | A1 | 9/2016 | Kanamoto | |
| 2017/0019477 | A1* | 1/2017 | Yamada | H04L 67/1001 |
| 2018/0018545 | A1* | 1/2018 | Tastl | G06F 3/1204 |
| 2018/0239566 | A1 | 8/2018 | Kanamoto | |

(Continued)

OTHER PUBLICATIONS

"Creating a PDF Hot Folder on your Desktop" Canon Knowledge Base, Article ID ART129691, May 12, 2015, https://support.usa.canon.com/kb/index?page=content&id=ART129691&cat=2163B002&actp=LIST (accessed and printed on Nov. 2, 2021).

(Continued)

*Primary Examiner* — Helen Zong
(74) *Attorney, Agent, or Firm* — GrowIP Law Group LLC

(57) ABSTRACT

A method is provided that includes receiving, at a hot folder that processes print job files according to default print instructions associated with the hot folder, a submitted file selected from (a) a submitted print job file or (b) a submitted print ticket, where the submitted print ticket includes at least one submitted print instruction. The method further includes starting a delay timer upon receiving the submitted file, waiting to process the submitted file until the delay timer has expired, and, upon expiration of the delay timer, processing the submitted file. Also described are a non-transitory computer-readable medium and a printing device.

20 Claims, 6 Drawing Sheets

(56) References Cited

U.S. PATENT DOCUMENTS

2020/0034087 A1* 1/2020 Iida .................. G06F 3/1228
2021/0133179 A1* 5/2021 Lee .................. G06F 16/21
2022/0050644 A1* 2/2022 Kikuchi ............ G06F 3/1208
2022/0171582 A1* 6/2022 Higashi ............ G06F 3/1257

OTHER PUBLICATIONS

"Direct Print: Printing a File by Copying to the Hot Folder" Konica Minolta. https://manuals.konicaminolta.eu/bizhub-PRESS-C1100-C1085/EN/contents/id19-_101250643.html (accessed and printed on Nov. 2, 2021).

"How to Create Hot Folders: GX Print Server, Version 2.0" Fuji Xerox, http://m1-onlinesupport.fujixerox.com/driver_downloads/HTD/HTD_how_to_create_hot_folders-gxprintserver.pdf, (Accessed and Printed Nov. 2, 2021).

"Mount a Hot Folder Queue at a Computer to Accept Jobs" Article ID x_prodsys_en-O33806, dated Sept. 1, 2015, printed Feb. 8, 2021.

"Submitting Jobs to a Hot Folder" efi, https://help.efi.com/fieryhotfolders/3.7/en-us/GUID-A642DD57-C3D2-4159-8041-D09CFBF5ECFB.html (Accessed and printed on Nov. 2, 2021.).

"Using Hot Folders" TotalFlow MR, User's Guide, 2012, http://support.ricoh.com/bb_v1oi/pub_e/pi_view/0001044/0001044134/view/users/int/Hot_folder.htm (Accessed and printed Nov. 2, 2021.).

* cited by examiner

HOT FOLDERS WITH ENHANCED PRINT TICKETING FUNCTIONALITY

FIELD

This disclosure relates to the field of production printing, and, in particular, to using hot folders for submitting print jobs.

BACKGROUND

Hot folders allow clients, e.g., software applications, to print by saving a print job to a particular hot folder over a network. This enables integration between disparate systems in a production print environment. Each hot folder may have an associated set of print instructions (e.g., print quantity, media, and finishing), such that by saving the print job to the particular hot folder, that hot folder's associated print instructions (i.e., the default print instructions) will be used when printing the print job file.

Some print job file types, such as postscript and some other Page Description Language (PDL) file types, allow the client to specify comprehensive print instructions, including print quantity, print media, and print finishing, via embedded print ticketing. Other file types such as Portable Document Format (PDF) do not allow for the same type of embedded print ticketing, but support the use of print ticket files, such as Job Definition Format (JDF) or Exchange Job Definition Format (XJDF) files, to specify complete print instructions for associated print jobs. However, typical conventional hot folder functionality does not support the use of such print ticket files with print jobs.

Needed are improved systems, apparatus, and methods for providing improved hot folder functionality with print ticketing capabilities to provide greater flexibility in print job workflows.

SUMMARY

One embodiment set forth herein is directed to a method that includes receiving, at a hot folder that processes print job files according to default print instructions associated with the hot folder, a submitted file selected from (a) a submitted print job file or (b) a submitted print ticket, where the submitted print ticket includes at least one submitted print instruction. The method further includes starting a delay timer upon receiving the submitted file, waiting to process the submitted file until the delay timer has expired, and, upon expiration of the delay timer, processing the submitted file.

A second embodiment set forth herein is directed to a non-transitory computer-readable medium having instructions stored therein to cause a processor to perform functions that include receiving, at a hot folder that processes print job files according to default print instructions associated with the hot folder, a submitted file selected from (a) a submitted print job file or (b) a submitted print ticket, where the submitted print ticket includes at least one submitted print instruction. The method further includes starting a delay timer upon receiving the submitted file, waiting to process the submitted file until the delay timer has expired, and, upon expiration of the delay timer, processing the submitted file.

A third embodiment set forth herein is directed to a printing device having a print controller comprising at least one processor and a non-transitory computer-readable medium having instructions stored therein to cause the at least one processor to perform functions on behalf of the printing device. The functions include the following: receiving, at a hot folder that processes print job files according to default print instructions associated with the hot folder, a submitted file selected from (a) a submitted print job file or (b) a submitted print ticket, where the submitted print ticket includes at least one submitted print instruction. The method further includes starting a delay timer upon receiving the submitted file, waiting to process the submitted file until the delay timer has expired, and, upon expiration of the delay timer, processing the submitted file.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

The accompanying drawings are included to provide a further understanding of the systems, apparatus, devices, and/or methods of the disclosure, and are incorporated in and constitute a part of this specification. The drawings are not necessarily to scale, and sizes of various elements may be distorted for clarity and/or illustrated as simplistic representations to promote comprehension. The drawings illustrate one or more embodiments of the disclosure, and together with the description, serve to explain the principles and operation of the disclosure.

DETAILED DESCRIPTION

Figure 1:
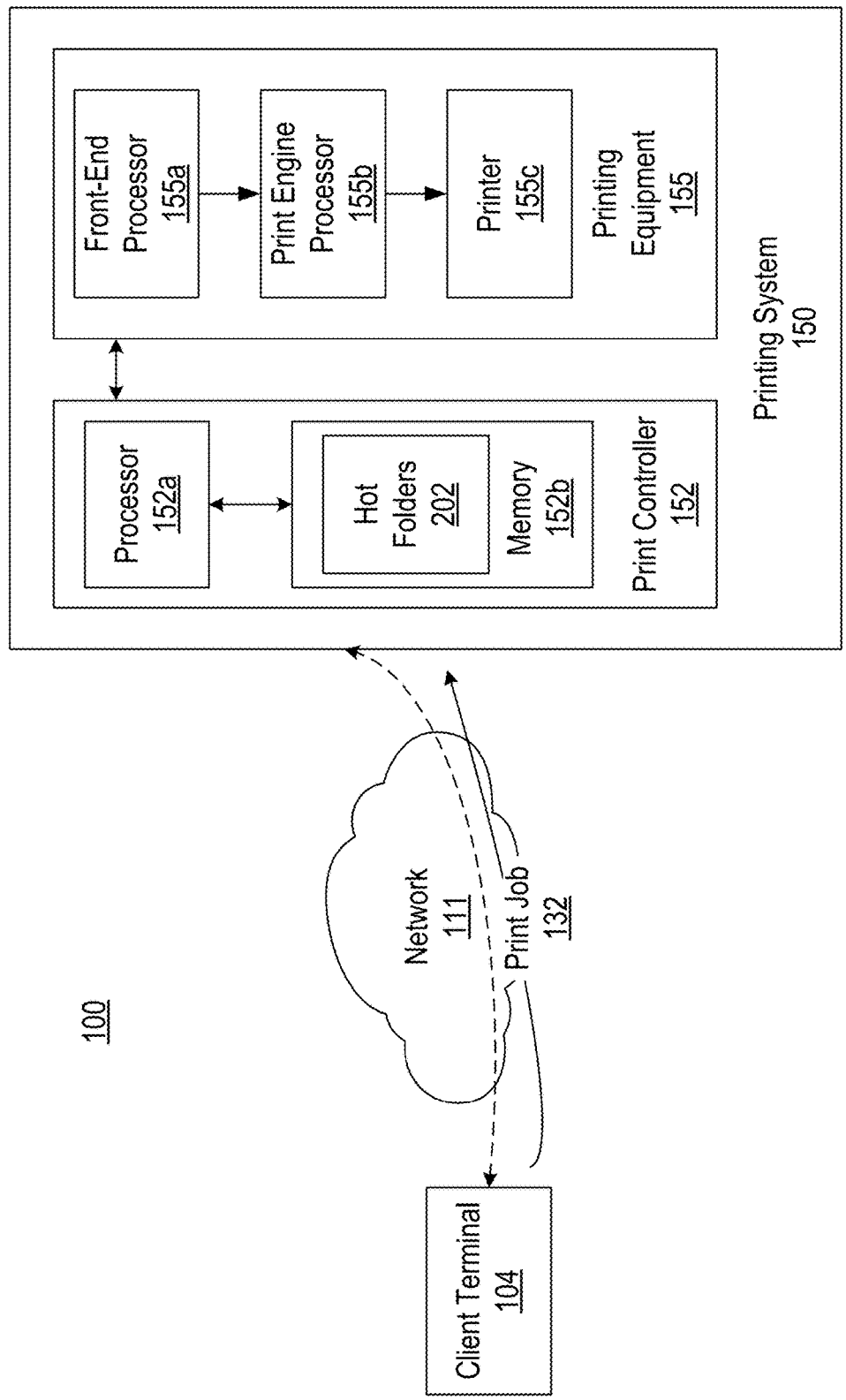
FIG. 1 is a simplified block diagram illustrating an environment that includes various entities that cooperate to facilitate providing hot folders with enhanced print ticketing functionality, according to an example embodiment.

Example systems, apparatus, devices, and/or methods are described herein. It should be understood that the word "example" is used to mean "serving as an example, instance, or illustration." Any embodiment or feature described herein as being an "example" is not necessarily to be construed as preferred or advantageous over other embodiments or features unless stated as such. Thus, other embodiments can be utilized, and other changes can be made, without departing from the scope of the subject matter presented herein. The aspects described herein are not limited to specific embodiments, apparatus, or configurations, and as such can, of course, vary. It should be readily understood that the aspects of the present disclosure, as generally described herein, and illustrated in the figures, can be arranged, substituted, combined, separated, and designed in a wide variety of different configurations. It is also to be understood that the terminology used herein is for the purpose of describing particular aspects only, and unless specifically defined herein, is not intended to be limiting.

Throughout this specification, unless the context requires otherwise, the words "comprise" and "include" and variations (e.g., "comprises," "comprising," "includes," "including," "has," and "having") will be understood to imply the inclusion of a stated component, feature, element, or step or group of components, features, elements, or steps, but not the exclusion of any other component, feature, element, or step or group of components, features, elements, or steps.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

As used in the specification and the appended claims, the singular forms "a," "an," and "the" include plural referents unless the context clearly dictates otherwise.

Ranges can be expressed herein as from "about" one particular value and/or to "about" another particular value. When such a range is expressed, another aspect includes from the one particular value and/or to the other particular value. Similarly, when values are expressed as approximations by use of the antecedent "about," it will be understood that the particular value forms another aspect. It will be further understood that the endpoints of each of the ranges are significant both in relation to the other endpoint and independently of the other endpoint.

Any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. HOT FOLDERS WITH ENHANCED PRINT TICKETING FUNCTIONALITY

A. Overview

To assist in implementing hot folders with enhanced print ticketing functionality such as to provide greater flexibility in print job workflows, the presently described technology includes various add-ons, substitutions, and/or rules to conventional hot folders used for production printing.

First, according to example embodiments, typical hot folder functionality is maintained, including the abilities to (a) automatically process files saved to a hot folder or to a sub-folder in the hot folder, (b) apply default print instructions to files saved in a specific hot folder or sub-folder, and (c) receive a print ticket file which references a print job file (e.g., stored in a folder within the hot folder or stored in a remote location accessible via a network protocol, such as http, ftp, smb, etc.).

Second, example embodiments set forth herein include adding the ability to specify delay timers for hot folders. The proposed delay timers are used to delay processing of print job files received in the hot folders. These processing delays are intended to provide enough time for both the print ticket file and the print job file to be copied into the hot folder.

The proposed use of delay timers to delay processing of print job files differs considerably from how timers have otherwise been used in conjunction with hot folders. Existing hot folder implementations have utilized timers in two different ways, both of which are unrelated to the presently described delay timers: (1) to define a polling interval (i.e., how often the system scans the hot folder for files) and (2) to define a grouping interval (i.e., files submitted within n timeframe are submitted sequentially). Unlike a polling timer, the processing delay proposed herein starts after the system has detected that there is a file in the hot folder. In addition, in at least some embodiments, the delay timers with processing delays are applied to individual files, rather than to groups of files.

In addition to the above, the description herein, with accompanying drawings, sets forth various examples and alternative embodiments and/or implementations relating to delay timers for introducing processing delays. These examples, alternative embodiments, and implementations can be used to assist in implementing hot folders with enhanced print ticketing for a multitude of different production printing applications and environments.

B. Examples

FIG. 1 is a simplified block diagram illustrating an environment that includes various entities that cooperate to provide hot folders with enhanced print ticketing functionality, according to an example embodiment. Example entities of the environment 100 can include a client terminal 104 and a printing system 150. The various entities of the environment 100 can be configured to communicate with one another via a network 111, such as a Local Area Network (LAN), Wide Area Network (WAN), such as the Internet, or another type of wired or wireless network.

The printing system 150 can include a controller 152 and printing equipment 155. In one example, the controller 152 can be configured to coordinate operations performed by the printing equipment 155. For example, the controller 152 can be configured to receive print job requests 132 (also referred to as "print jobs" and/or "print job files" herein) from entities outside of the printing system 150 and to communicate the print job requests 132 to the printing equipment 155. As described in more detail below, the controller 152 can be further configured to provide functionality to the printing system 150 that allows end users, such as client terminal 104, to utilize hot folders with enhanced print ticketing functionality for print jobs sent via print job requests 132.

In one example, the printing equipment 155 can include a Front-End Processor (FEP) 155a, a Print Engine Processor (PEP) 155b, and one or more printers 155c. The FEP 155a, also referred to as a Digital Front-End (DFE) herein, can be configured to convert bitmap images, vector graphics, fonts, etc., associated with pages specified in the print job request 132 to a bitmap/rasterized representation of the image (e.g., C, M, Y, and K pixels). The manner in which the FEP 155a rasterizes the pages specified in the print job request can depend on various image rasterization parameters of the FEP 155a. For example, these image rasterization parameters may include and/or effect calibration curves, paper definitions, international color consortium profiles (ICC profiles), spot color definitions, tone adjustment curves, color conversion settings, colorant limits (e.g., ink, toner), rendering intent, K preservation, CGR level, etc., max colorant densities, print margin, and/or halftones.

In one example, the PEP 155*b* can be included or in communication with the printer 155*c*. The printer 155*c* can correspond to an industrial printer, for example, such as one capable of printing thousands of pages an hour. In this regard, the printer 155*c* can be ink-based, toner-based, or can use a different medium. The PEP 155*b* can include various parameters that can control the operation of the printer 155*c*, based on print instructions included in or with the print job request 132.

The controller 152 can include a processor 152*a* and a memory 152*b*. The controller 152 can include other subsystems, such as an input/output (I/O) subsystem, for example. The processor 152*a* is in communication with the memory 152*b*. The processor 152*a* is configured to execute instruction code stored in the memory 152*b*. The instruction code facilitates performing, by the controller 152, various functions associated with providing to end users, such as client terminal 104, hot folders with enhanced print ticketing functionality for print jobs sent via print job requests 132. The memory 152*b* (or another data storage unit) can also store one or more hot folders 202 to allow clients to print by saving print jobs 132 to particular hot folders 202 over the network 111. Each hot folder 202 may have an associated set of print instructions (e.g., print quantity, media, and finishing), such that when a particular print job 132 is saved to the particular hot folder 202 (or to a subfolder in the particular hot folder 202), that hot folder's associated print instructions will be used when printing the print job 132. The processor 152*a* can correspond to a stand-alone computer system such as an Intel®, AMD®, or ARM® based computer system or a different computer system and can include application-specific computer systems. The computer system can include an operating system, such as Microsoft Windows®, Linux, Unix®, Mac OS®, or a different operating system. In addition, the operations performed by the various subsystems can be combined into a fewer or greater number of subsystems to facilitate speed scaling, cost reductions, etc.

While, in the example of FIG. 1 and elsewhere throughout this description, the print controller 152 is illustrated and described as implementing the hot folders 202, the hot folders 202 may instead be implemented elsewhere in the printing system 150 or in another related, associated, or connected device or system.

Figure 2:
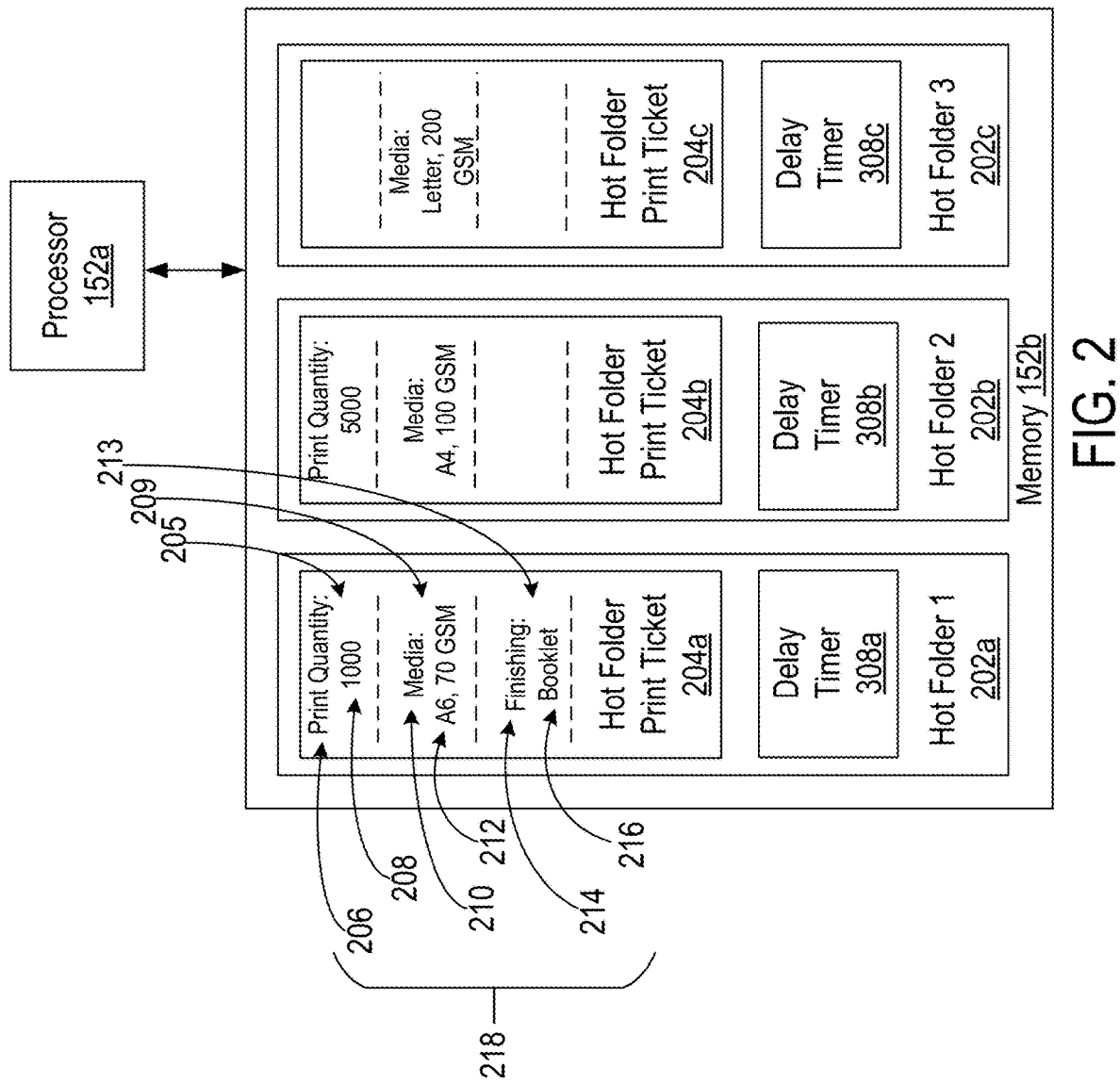
FIG. 2 is a simplified schematic diagram illustrating a plurality of hot folders with enhanced print ticketing, according to an example embodiment.

FIG. 2 is a simplified schematic diagram illustrating a plurality of hot folders 202*a*-202*c* stored in the memory 152*b*, according to an example embodiment. The memory 152*b* may be part of the print controller 152, for example, with the processor 152*a* executing stored instructions to perform tasks relating to providing hot folders with enhanced print ticket functionality. The memory (or other associated memories) may have fewer or more than the three illustrated hot folders 202*a*-202*c*, and each hot folder may have one or more sub-folders, in some examples.

Each of the hot folders 202*a*, 202*b*, and 202*c* may have one or more hot folder print tickets, such as hot folder print tickets 204*a*-204*c* associated with it. Alternatively, some hot folders (not pictured) may not include any print tickets. As shown in FIG. 2, hot folder 202*a* has a hot folder print ticket 204*a* associated with it, hot folder 202*b* has a hot folder print ticket 204*b* associated with it, and hot folder 202*c* has hot folder print ticket 204*c* associated with it.

Each of the hot folder print tickets 204*a*-204*c* may have one or more associated hot folder print instructions to serve as default print instructions for print jobs saved to the respective hot folders. Alternatively, some hot folder print tickets (not pictured) may not include any hot folder print instructions. As shown in FIG. 2, hot folder print ticket 204*a* has a plurality of hot folder print instructions 218, provided as an illustrative example. The plurality of hot folder print instructions 218 associated with hot folder print ticket 204 includes the following: a "print quantity" print instruction 205, a "media" print instruction 209, and a "finishing" print instruction 213. Each of the hot folder print instructions, in turn, comprises a hot ticket print ticket property and a hot ticket print ticket property value. In the example of FIG. 2, the "print quantity" print instruction 205 includes a "print quantity" property 206 and an associated "print quantity" value 208 of "1000." The "media" print instruction 209 includes a "media" property 210 and an associated "media" value 212 of "A6, 70 GSM." The "finishing" print instruction 213 includes a "finishing" property 214 and an associated "finishing value 216 of "Booklet." The aforementioned print instructions are merely examples, and many other types of print instructions (including print instruction properties and property values) may also be specified and utilized.

Similarly, hot folder print ticket 204*b* in hot folder 202*b* has a "print quantity" print instruction with a property value of "5000" and a "media" print instruction with a property value of "A4, 100 GSM." Hot folder print ticket 204*c* in hot folder 202*c* has a "media" print instruction with a property value of "Letter, 200 GSM."

Each of the hot folders 202*a*, 202*b*, and 202*c* may additionally include one or more respective delay timers 308*a*, 308*b*, and 308*c* specified for it, such as via a user entering a delay timer definition (described in further detail below) via a user interface, for example. The delay timers may be implemented as countdown timers utilizing a system clock, such as one associated with the processor 905 in the computer system 900 illustrated in FIG. 6, for example.

In accordance with embodiments herein, a print job file to submitted to any of the hot folders 202*a*, 202*b*, or 202*c* without an associated print ticket (and without embedded print ticketing, such as that provided by postscript files) will have the default print instructions for that particular hot folder 202*a*, 202*b*, or 202*c* applied to that print job file. However, if a print job file, such as a pdf file, is submitted to one of the hot folders 202*a*, 202*b*, or 202*c* along with an associated print ticket, such as an xjdf file, then various embodiments herein include applying a delay timer to processing of the print job file or print ticket.

Figure 3:
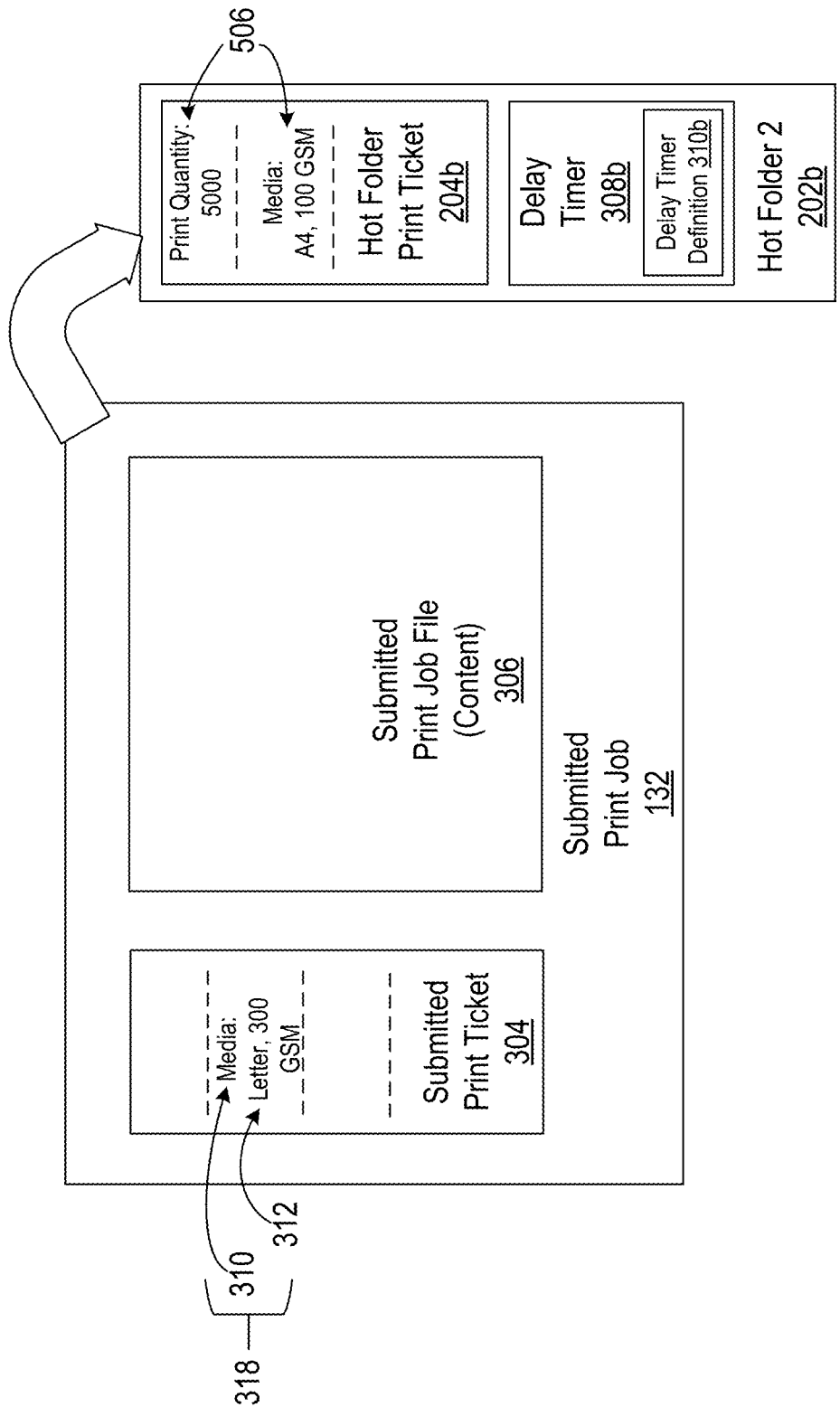
FIG. 3 is a simplified schematic diagram illustrating a print job submitted to a hot folder with enhanced print ticketing, according to an example embodiment.

FIG. 3 is a simplified schematic diagram illustrating the submitted print job 132 being received at the hot folder 202*b*, according to an example embodiment. The submitted print job 132 includes, among possibly other items, a submitted print ticket 304 and a submitted print job file 306. While FIG. 3 illustrates the submitted print ticket 304 and submitted print job file 306 as being received at the hot folder 202*b* as a single entity (i.e., a submitted print job), in actuality, the submitted print ticket 304 and submitted print job file 306 are two (or more) separate submitted files, which may be received in either order, depending on client capabilities. In addition, the submitted print job file 306 may be stored at a remote location specified by a reference (e.g., filename and filepath) in the submitted print ticket 304. The enhanced print ticketing set forth herein addresses problems that might arise due to submitted print tickets and submitted print job files being separate files, potentially being stored at such remote locations.

The enhanced print ticketing includes specifying one or more delay timers. Delay timer 308*b* specified for the hot folder 202*b* includes a delay timer definition 310*b* specifying at least a respective delay time period (e.g., 5 minutes) and at least one file type (e.g., pdf) to which the respective delay timer applies. As discussed previously, in some cases in which delay timers are not utilized, the submitted print ticket 304 might be copied into the hot folder 202b before the submitted print job file 306 has finished copying, which could be problematic if the print ticket includes a reference to the not-yet-copied submitted print job file 306. The processing delays provided by the delay timers set forth herein are intended to provide enough time for both the print ticket file and the print job file to be copied into the hot folder.

The submitted print ticket 304 may have associated submitted print instructions that override any default print instructions, such as print instructions 506, in the hot folder 202b to which the submitted print job 132 is saved. As shown in FIG. 3, submitted print ticket 304 has a "media" submitted print instruction 318, provided as an illustrative example. The "media" submitted print instruction comprises a "media" print ticket property 310 and a "media" print ticket property value 312. The submitted print job file 306 may include content for printing, such as data representing a plurality of bitmap images, vector graphics, characters, fonts, etc., and will be processed according to the print instructions 318 in the submitted print ticket 304.

Figure 4:
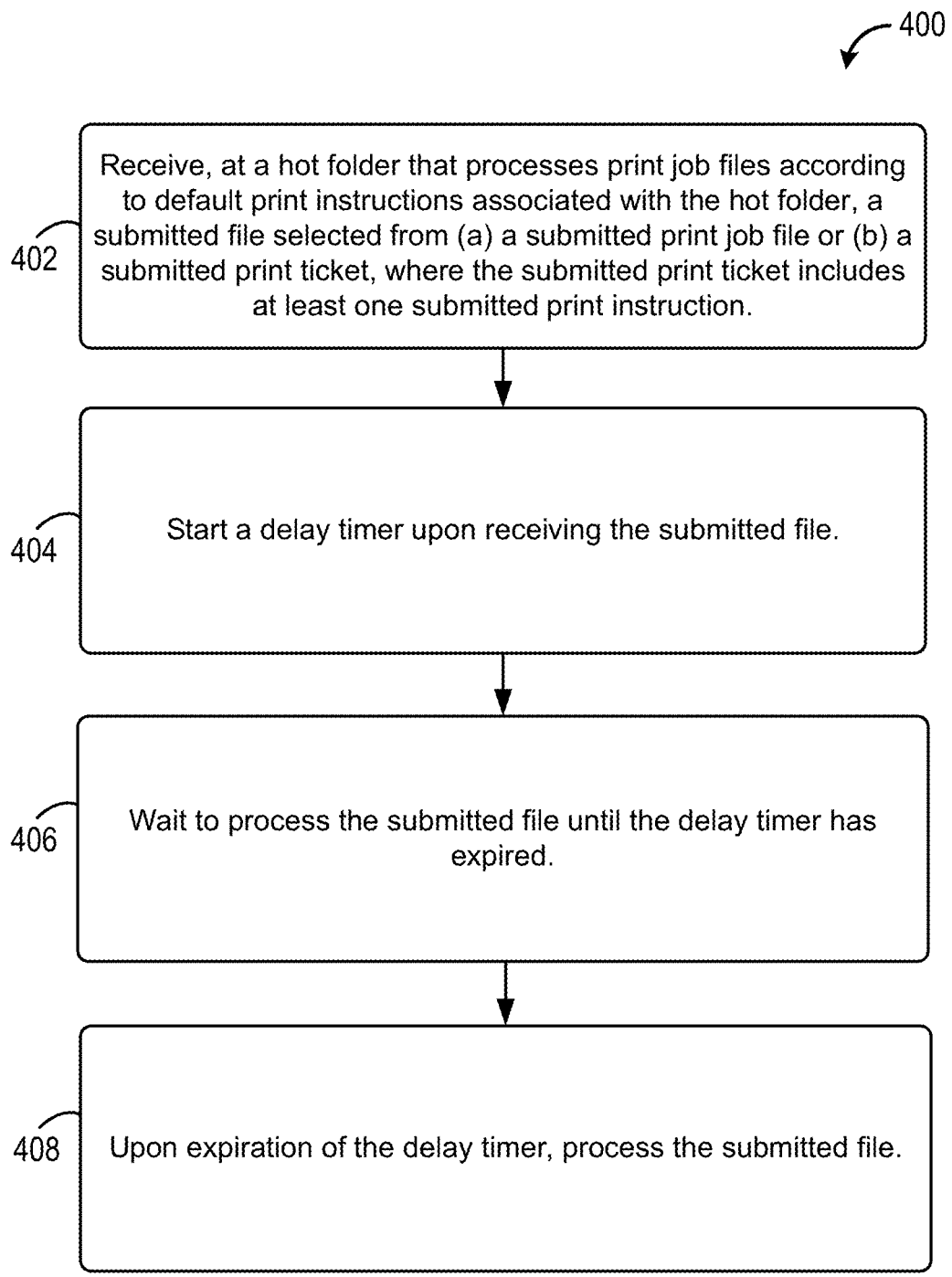
FIG. 4 is a flow diagram illustrating a method for processing a print job using a hot folder having enhanced print ticket functionality, according to a first example embodiment.

FIG. 4 is a flow diagram illustrating a method 400 for processing a print job using a hot folder having enhanced print ticket functionality, according to a first example embodiment. In particular, method 400 may represent a specific sequence or series of actions that, when performed, allows for the provision of hot folders with enhanced print ticketing. The method 400 and variations (see the examples set forth in the following description) could be a series or plurality of functions performed by a processor executing instructions stored on a non-transitory computer-readable medium, as described with respect to FIG. 6, for example. In another example, the method 400 could be performed at printing device having a print controller with at least one processor and a non-transitory computer-readable medium having instructions stored therein to cause the at least one processor to perform functions associated with the method 400, including variations thereof.

In block 402, the method 400 involves receiving, at a hot folder that processes print job files according to default print instructions associated with the hot folder, a submitted file selected from (a) a submitted print job file or (b) a submitted print ticket, wherein the submitted print ticket includes at least one submitted print instruction. In block 404, the method 400 involves starting a delay timer upon receiving the submitted file. In block 406, the method 400 involves waiting to process the submitted file until the delay timer has expired. In block 408, the method 400 involves, upon expiration of the delay timer, processing the submitted file.

Receiving the submitted file (block 402) may simply include or consist of detecting that the submitted file is in the hot folder, where the delay timer is started upon detecting that the submitted file is in the hot folder. The submitted file may be saved to the hot folder via a user action, for example.

In one example, receiving a submitted file selected from (a) a submitted print job file of (b) a submitted print ticket (block 402) may involve the submitted file being the submitted print job file. The submitted print job file may be a pdf file, for example. In such a case, processing the submitted file may include processing the submitted print job file using the default print instructions associated with the hot folder. The method may further include, after processing the submitted print job file using the default print instructions associated with the hot folder, deleting, from the hot folder, the submitted print job file.

In another example, receiving a submitted file selected from (a) a submitted print job file of (b) a submitted print ticket (block 402) may involve the submitted file being the submitted print ticket, where the submitted print ticket includes a reference (e.g., a reference including a filename and/or a filepath associated with the submitted print job file) to the submitted print job file. The submitted print ticket may be an xjdf file, for example. In such a case, processing the submitted file may include processing the submitted print job file using the at least one submitted print instruction in the submitted print ticket. The method may further include, after processing the submitted print job file using the at least one submitted print instruction in the submitted print ticket, deleting, from the hot folder, both the submitted print ticket and the submitted print job file.

The submitted print job file may be received via a data transmission to the hot folder or the submitted print job file may be stored in the hot folder or in a subfolder within the hot folder. Where the submitted print job file is stored at a remote location (e.g., an asset management system) and the reference in the submitted print ticket includes a reference to the remote location (e.g., a web Uniform Resource Locator (URL) or a network folder location/path), the method may further include downloading the submitted print job file from the remote location, such as by initiating a data transmission according to a network protocol selected from http, ftp, or smb. In accordance with at least one embodiment, the submitted print job file is downloaded from a remote location once the delay timer is started. Wherein the remote location is an asset management system.

In one example, starting a delay timer upon receiving the submitted file (block 404) may include starting a countdown timer having an associated delay time period. For example, the delay time period may be more than zero (0) seconds, such as 30 seconds, 3 minutes, or 5 minutes, with the delay time period corresponding to (e.g., slightly more than or conservatively more than (e.g., double or triple)) a typical time required to copy a file to the hot folder. In another example, starting a delay timer upon receiving the submitted file (block 404) may include starting a countdown timer having a delay time period of zero (0) seconds (e.g., initiating processing without immediately, without any delay), which may be effected by omitting any action involving the delay timer.

The delay time period should be selected to be long enough to allow both the submitted print ticket and the submitted print job file(s) to be saved to the hot folder, so that the submitted print job file(s) can be processed in accordance with the submitted print instructions in the submitted print ticket. In some examples, the method may include receiving a specification of the associated delay time period, such as by receiving an input from a user via a user interface. In some examples, the user can specify multiple delay time periods for multiple delay timers in the hot folder, with each delay timer being associated with one or more particular print job files.

In one example, waiting to process the submitted file until the delay timer has expired (block 406) involves not taking any action (other than decrementing the counter). In another example, waiting to process the submitted file until the delay timer has expired (block 406) may simply involve maintaining the submitted file in the hot folder (or another location) while the delay timer proceeds toward expiration (e.g., decrements to zero (0)).

In one example, processing the submitted file upon expiration of the delay timer (block 408) involves applying the (a) default print instructions or (b) the at least one submitted print instruction from the submitted print ticket to the submitted print job file and printing the submitted print job according to the default print instructions or submitted print instructions.

Figure 5:
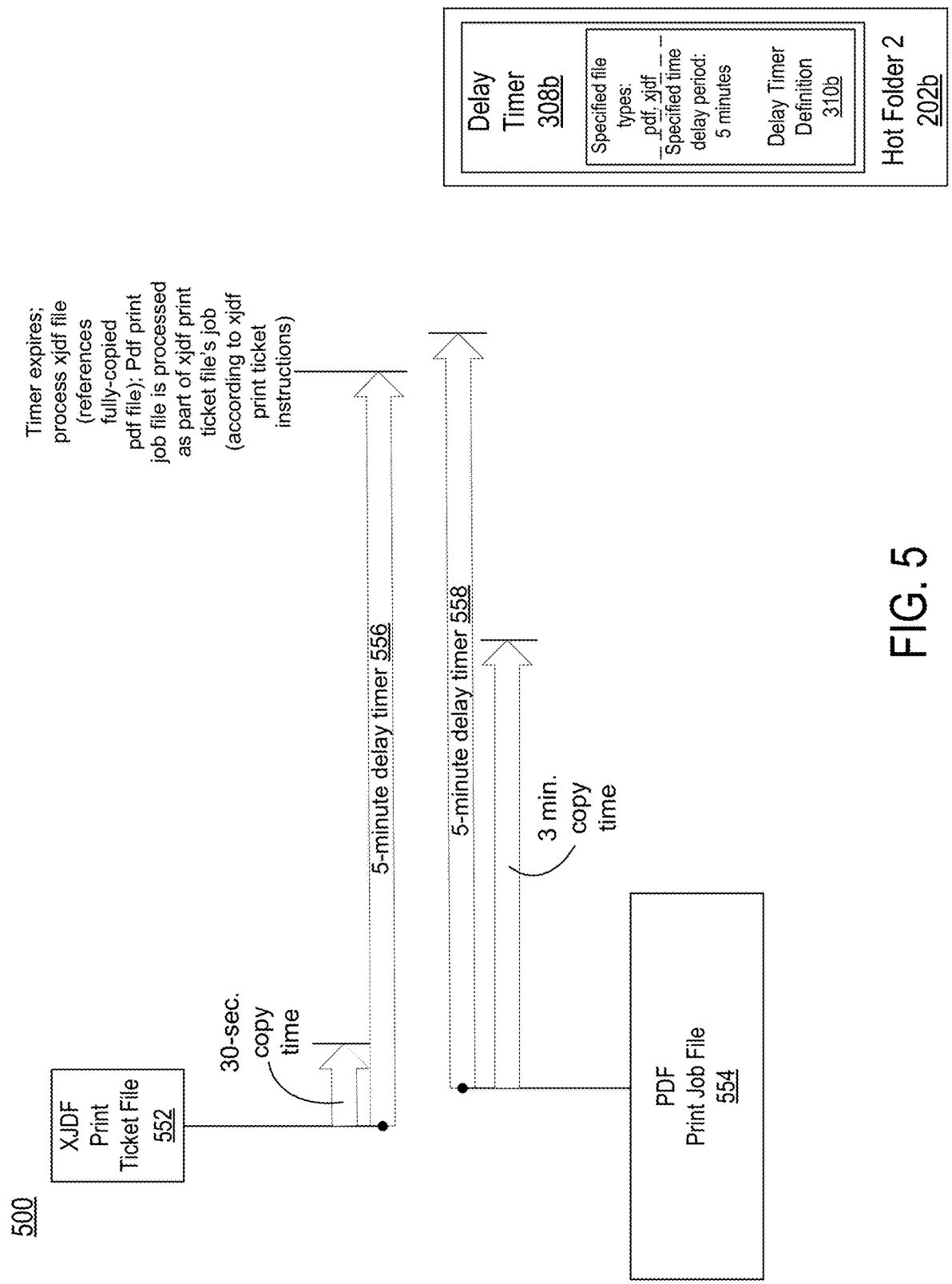
FIG. 5 is a simplified schematic diagram illustrating an example application of the method, according to an example embodiment.

FIG. 5 is a simplified schematic diagram illustrating an example application 500 of the method 400, according to an example embodiment. Assume a delay timer has an associated defined delay of five minutes, as specified by the delay timer definition 310b associated with the delay timer 308b of hot folder 202b. Assume also that a client copies an xjdf print ticket file 552, followed by a much larger pdf print job file 554, to the hot folder 202b. Assume that the xjdf print ticket file 552 takes thirty seconds to copy, while the pdf job file 554 takes three minutes to copy (due to the larger file size of the pdf print job file 554 compared to the xjdf print ticket file 552). Since the delay timer 556 for the xjdf file expires thirty seconds before the delay timer 558 for the pdf print job file expires, the system will process the xjdf print ticket file 552 first. The processed xjdf print ticket file 552 will, in turn, reference the pdf print job file 554, causing that pdf print job file 554 to be processed as part of the xjdf print ticket file's 552 job (and not separately). As a variation to this example, if no xjdf print ticket file were to be submitted within the allotted time (as defined by the delay timer 558), then the pdf print job file 554 would be processed without print instructions (i.e., in accordance with the hot folder's default print instructions).

The above approach has the following benefits: (1) the client does not need to include a server from which the Digital Front End (DFE) would download the pdf (many clients do not have this functionality), and in addition, there is no need to provide credentials to the DFE for access to download the pdf; (2) the client does not have to store the pdf file in an unmonitored location and then submit the xjdf file to the hot folder (many clients do not have the ability to distribute files to multiple locations); and (3) the client does not have to ensure that the pdf file has completed copying before it saves the xjdf file (some clients do not have the ability to sequence file copying in this manner).

Embodiments of the method 400 may additionally include selecting the delay timer from among a plurality of delay timers comprising at least a first delay timer and a second delay timer, where the first delay timer is characterized by a first delay timer definition and the second delay timer is characterized by a second delay timer definition that differs from the first delay timer definition. Each delay timer definition specifies a respective delay time period and at least one file type to which the respective delay timer applies, according to example embodiments. Selecting the delay timer may include determining a submitted file type of the received submitted file, and based on the submitted file type, selecting one of the plurality of delay timers having a delay timer definition specifying the submitted file type as the at least one file type to which that selected one of the plurality of delay timers applies.

For example, assume the first delay timer definition specifies *.pdf and *.xdjf as file types to which the first delay timer applies, and that the first delay timer definition specifies a non-zero delay time period. Assume the second delay timer definition specifies *.ps and *.pcl as file types to which the second delay timer applies, and that the second delay timer definition specifies a zero delay time period. This configuration causes the submitted file to be processed immediately if the submitted file type of the submitted file is *.ps or *.pcl, which improves processing efficiency (i.e., removes unnecessary delay).

As another example, consider a case where a client is capable of controlling a sequence of submitted files written to the hot folder. In such a case, it may be advantageous for the first delay timer definition to specify *.pdf as a file type to which the first delay timer applies and to set the delay time period to a first non-zero delay time period (e.g., 4 minutes). Then, the second delay timer definition could specify *.xjdf as a file type to which the second delay timer applies and set the delay time period to a zero (i.e., 0 seconds) delay time period, thereby causing the submitted file to be processed immediately if the submitted file type of the submitted file is *.xjdf. This configuration, like the one above, removes unnecessary delay.

The delay timers utilized in various embodiments set forth herein may be globally applicable to a plurality of hot folders. In another example, a particular delay timer is applicable only to a specific hot folder, including any sub-folders in the hot folder. In yet another example, the delay timer is applicable only to a specific sub-folder in the hot folder.

In other embodiments, each of two or more delay timers (i.e., a plurality of delay timers) has an associated filter pattern to evaluate at least one of the following for the submitted file: (a) a file name or (b) print job metadata. For example, the print job metadata may include pdf file metadata selected from the following: (a) title, (b) author, (c) subject, or (d) a keyword field. Alternatively, the print job metadata includes file contents, such as element values evaluated using XPath for *.xml files or a JSON Pointer for *.json files.

In yet other embodiments, a plurality of delay timers could include a first delay timer that is less granular than a second delay timer within the plurality, and the method could further include selecting the first delay timer that is less granular if the submitted file does not match a filter pattern for a more granular file location.

Some embodiments include using a delay timer as a shared timer for a print job comprising a plurality of submitted print job files, such as print job files submitted sequentially or in a First-In-First-Out (FIFO) configuration. The shared timer can be applied to the plurality of submitted print job files. For example, such embodiments could include receiving a user input specifying that the delay timer is to be applied as the shared timer. Utilizing a shared timer can cause all of the plurality of print job files referenced in an associated submitted print ticket to be received in the hot folder before the associated submitted print ticket is processed/received in the hot folder.

For example, as one modification to the method 400, when the delay timer is to be applied as the shared timer and when the submitted file received in the hot folder is the submitted print job file, the method could include (a) processing the submitted print job file immediately, without delay, (b) starting the shared delay timer immediately after the submitted print job file is received, (c) preventing other print jobs from being processed while the shared delay timer is running, (d) receiving a second submitted print job file in the hot folder, (e) queueing the second print job file for processing, (f) resetting the shared delay timer, (g) repeating the queueing and resetting for any subsequently received submitted print job files, thereby ensuring that submitted print job files submitted with a shared timer are processed sequentially in the sequence in which they were submitted, and (h) upon the shared delay timer expiring, being available to process another print job.

As another example modification to the method 400, when the delay timer is to be applied as the shared timer and when the submitted file received in the hot folder is the submitted print job file, the method could include (a) aggregating, in the hot folder, the plurality of print job files as they are received in the hot folder, (b) resetting and starting the shared delay timer immediately after each of the plurality of print job files is received, (c) preventing other print jobs from being processed while the shared delay timer is running, and (d) upon the shared delay timer expiring, processing the aggregated plurality of print job files. The method could further include being available to process another print job upon the shared delay timer expiring.

As another example modification to the method 400, when the delay timer is to be applied as the shared timer and when the submitted file received in the hot folder is the submitted print job file, the method could include (a) aggregating, in a pre-processing storage location (e.g., a Digital Front-End (DFE) of the print controller), the plurality of print job files as they are received in the hot folder, (b) resetting and starting the shared delay timer immediately after each of the plurality of print job files is received, (c) preventing other print jobs from being processed while the shared delay timer is running, and (d) upon the shared delay timer expiring, processing the plurality of print job files aggregated in the pre-processing storage location. The method could further include being available to process another print job upon the shared delay timer expiring.

Holding files in either the hot folder or in the DFE also provides an opportunity to specify file sorting order. For example, this would allow the client to write files in any sequence (as may happen if a multithreaded client is writing multiple files concurrently) while ensuring files are printed in the desired order. The files sorting may be specified using any available file information, such as filename, file metadata, or values extracted from the files themselves. Aggregating files before submission ensures that delays in receiving files do not impact productivity. For example, it may be possible that files are not copied to the printer fast enough to keep the printer busy. if using sequential or FIFO printing, this could negatively impact productivity. Waiting until all files are received before printing the job ensures that these sort of delays do not impact productivity. However, in general it is best to start printing immediately, as that enables concurrency in the end-to-end workflow (the system can receive files, while RIPping and printing).

In some examples, the submitted print ticket (e.g., submitted print ticket 304 in FIG. 3) associated with the submitted print job file is in the form of metadata associated with the print job. For example, the metadata could describe the at least one submitted print instruction. The metadata could be from the typical specified PDF metadata (e.g., Title, Author, Subject, Keywords). Alternatively, the PDF metadata may contain a Job Definition Format (JDF) file, which serves as the submitted print ticket to be blended with the hot folder JDF file (i.e., serving as a kind of hot folder print ticket). Where the submitted print ticket is in form of metadata, the method 400 could further include extracting the at least one submitted print instruction from the metadata associated with the print job. Extracting the at least one submitted print instruction from the metadata could include a processor applying a regular expression to the metadata associated with the print job, for example. Such an expression could be in the form of an if-then operation, for example.

In some examples, the submitted print ticket associated with the submitted print job is in the form of a filename associated with the print job. For example, the metadata could be a filename describing (e.g., constituting, at least in part) the at least one submitted print instruction, such as quality, media, or finishing. Where the submitted print ticket is in the form of a filename associated with the submitted print job, the method 400 could further comprise extracting the at least one submitted print instruction from the filename associated with the print job. Extracting the at least one submitted print instruction from the filename could include a processor applying a regular expression to the filename associated with the print job. For example, the filename may be "This is My Job-20-.pdf". The regular expression applied by the processor may be configured to result in a search for -<n digits>- and use that as the print quantity.

In some examples, such as where a particular hot folder includes more than one hot folder print ticket, the filename or metadata described above specifies a selection between a first hot folder print ticket and a second-hot folder print ticket. Rules could be configured to select between multiple print tickets based on information extracted from the filename or the metadata. For example, a hot folder may be configured with two print tickets—one for booklets and one for loose sheet printing. If a processor applying the rules to information extracted from a submitted print job finds the word "booklet" in the metadata, then a booklet-related hot folder print ticket could be applied to the submitted print job. Otherwise, according to the example rule, the submitted print job could be processed for printing without finishing. The rules may be used to either select between complete print tickets or to add specific settings to the print ticket, according to various examples.

For print jobs not having an associated submitted print ticket, the method 400 could include receiving, at a hot folder having an associated hot folder print ticket, a submitted print job not having an associated submitted print ticket and processing the print job using the at least one hot folder print instruction from the associated hot folder print ticket. In other words, print jobs not having an associated submitted print ticket will be printed according to the hot folder's default print instructions.

Figure 6:
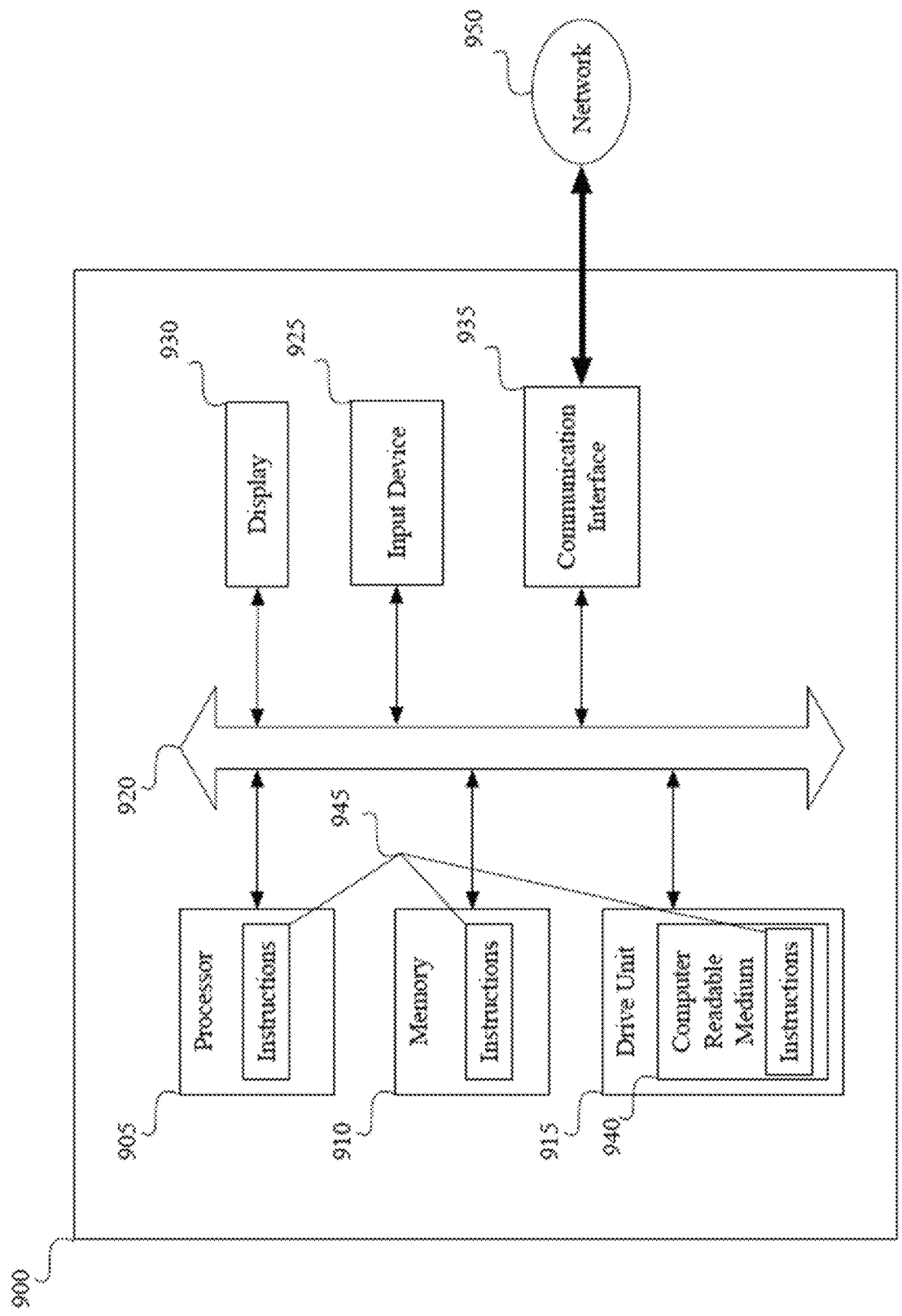
FIG. 6 is a simplified block diagram illustrating an example computer system that may be utilized in one or more example embodiments.

FIG. 6 is a simplified block diagram illustrating an example computer system 900 that may be utilized in one or more example embodiments. The computer system 900 can form part of or implement any of the systems and/or devices described above. The computer system 900 can include a set of instructions 945 that the processor 905 can execute to cause the computer system 900 to perform any of the operations described above. The computer system 900 can operate as a stand-alone device or can be connected, e.g., using a network, to other computer systems or peripheral devices, for example.

In a networked example, the computer system 900 can operate in the capacity of a server or as a client computer in a server-client network environment, or as a peer computer system in a peer-to-peer (or distributed) environment. The computer system 900 can also be implemented as or incorporated into various devices, such as a personal computer or a mobile device, capable of executing instructions 945 (sequential or otherwise), causing a device to perform one or more actions. Further, each of the systems described can include a collection of subsystems that individually or jointly execute a set, or multiple sets, of instructions to perform one or more computer operations.

The computer system 900 can include one or more memory devices 910 communicatively coupled to a bus 920 for communicating information. In addition, code operable to cause the computer system to perform operations described above can be stored in the memory 910. The memory 910 can be random-access memory, read-only memory, programmable memory, a hard disk drive, or any other type of memory or storage device.

The computer system 900 can include a display 930, such as a light-emitting diode (LED) display, liquid crystal display (LCD), a cathode ray tube (CRT), or any other display suitable for conveying information. The display 930 can act as an interface for the user to see processing results produced by processor 905.

Additionally, the computer system 900 can include an input device 925, such as a keyboard or mouse or touchscreen, configured to allow a user to interact with components of system 900.

The computer system 900 can also include a disk or optical drive unit 915. The drive unit 915 can include a computer-readable medium 940 in which the instructions 945 can be stored. The instructions 945 can reside completely, or at least partially, within the memory 910 and/or within the processor 905 during execution by the computer system 900. The memory 910 and the processor 905 also can include computer-readable media as discussed above.

The computer system 900 can include a communication interface 935 to support communications via a network 950. The network 950 can include wired networks, wireless networks, or combinations thereof. The communication interface 935 can enable communications via any number of communication standards, such as 802.11, 802.12, 802.20, WiMAX, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. "Computer program" as used herein refers to an expression, in a machine-executable language, code or notation, of a set of machine-executable instructions intended to cause a device to perform a particular function, either directly or after one or more of (a) conversion of a first language, code, or notation to another language, code, or notation; and (b) reproduction of a first language, code, or notation. Such a computer program may be stored as instructions in a non-transitory computer-readable medium, for example.

II. CONCLUSION

The above detailed description sets forth various features and operations of the disclosed systems, apparatus, devices, and/or methods with reference to the accompanying figures. The example embodiments described herein and in the figures are not meant to be limiting, with the true scope being indicated by the following claims. Many modifications and variations can be made without departing from its scope, as will be apparent to those skilled in the art. Functionally equivalent systems, apparatus, devices, and/or methods within the scope of the disclosure, in addition to those described herein, will be apparent to those skilled in the art from the foregoing descriptions. It will be readily understood that the aspects of the present disclosure, as generally described herein, and illustrated in the figures, can be arranged, substituted, combined, separated, and designed in a wide variety of different configurations. Such modifications and variations are intended to fall within the scope of the appended claims. Finally, all publications, patents, and patent applications cited herein are hereby incorporated by reference for all purposes.

What is claimed is:

1. A method for processing a print job, comprising:
receiving, at a hot folder that processes print job files according to default print instructions associated with the hot folder, a plurality of submitted files, wherein the plurality of submitted files includes at least (a) a submitted print job file and (b) a submitted print ticket, wherein the submitted print ticket includes at least one submitted print instruction;
selecting a respective corresponding delay timer for each of the plurality of submitted files received at the hot folder, wherein the corresponding delay timer for each of the plurality of submitted files is selected from among a plurality of delay timers specified for the hot folder, wherein each of the plurality of delay timers has a respective delay timer definition selected from at least a first delay timer definition and a second delay timer definition that differs from the first delay timer definition, and wherein the first delay timer definition and second delay timer definition each specify a respective delay time period and at least one hot folder to which the respective delay timer applies;
upon receiving each of the plurality of submitted files, starting the respective corresponding delay timer for the received submitted file in the plurality of submitted files;
waiting to process each of the plurality of submitted files by delaying processing each of the plurality of submitted files until the respective corresponding delay timer of the plurality of delay timers has expired by decrementing to zero; and
upon expiration of the respective corresponding delay timer, processing the submitted file corresponding to the expired respective corresponding delay timer by applying the (a) default print instructions or (b) the at least one submitted print instruction from the submitted print ticket to the submitted print job file and printing the submitted print job according to (a) the default print instructions associated with the hot folder or (b) the submitted print instructions.

2. The method of claim 1, wherein the submitted print ticket includes a reference to the submitted print job file.

3. The method of claim 2, further comprising, after processing the submitted print job file using the at least one submitted print instruction in the submitted print ticket, deleting, from the hot folder, both the submitted print ticket and the submitted print job file referenced in the submitted print ticket.

4. The method of claim 2, wherein the submitted print job file is stored at a remote location, and wherein the submitted print ticket includes a reference to the remote location, the method further comprising downloading the submitted print job file from the remote location.

5. The method of claim 2, wherein each respective corresponding delay timer selected for each of the plurality of submitted files has an associated specified delay time period that is long enough to allow both the submitted print ticket and the submitted print job file to be saved to the hot folder.

6. The method of claim 1, wherein the print job comprises a plurality of submitted print job files associated with the submitted print ticket, and wherein the respective corresponding delay timer is applied as a shared timer to the plurality of submitted print job files.

7. The method of claim 1, wherein each of the plurality of delay timers has an associated filter pattern.

8. The method of claim 7, wherein the associated filter pattern for each of the plurality of delay timers evaluates at least one of the following for each of the plurality of submitted files: (a) a file name or (b) print job metadata.

9. A non-transitory computer-readable medium having instructions stored therein to cause a processor to perform functions to process a print job, the functions comprising:
   receiving, at a hot folder that processes print job files according to default print instructions associated with the hot folder, a plurality of submitted files, wherein the plurality of submitted files includes at least (a) a submitted print job file and (b) a submitted print ticket, wherein the submitted print ticket includes at least one submitted print instruction;
   selecting a respective corresponding delay timer for each of the plurality of submitted files received at the hot folder, wherein the corresponding delay timer for each of the plurality of submitted files is selected from among a plurality of delay timers specified for the hot folder, wherein each of the plurality of delay timers has a respective delay timer definition selected from at least a first delay timer definition and a second delay timer definition that differs from the first delay timer definition, and wherein the first delay timer definition and second delay timer definition each specify a respective delay time period and at least one hot folder to which the respective delay timer applies;
   upon receiving each of the plurality of submitted files, starting the respective corresponding delay timer for the received submitted file in the plurality of submitted files;
   waiting to process each of the plurality of submitted files by delaying processing each of the plurality of submitted files until the respective corresponding delay timer of the plurality of delay timers has expired by decrementing to zero; and
   upon expiration of the respective corresponding delay timer, processing the submitted file corresponding to the expired respective corresponding delay timer by applying the (a) default print instructions or (b) the at least one submitted print instruction from the submitted print ticket to the submitted print job file and printing the submitted print job according to (a) the default print instructions associated with the hot folder or (b) the submitted print instructions.

10. The non-transitory computer-readable medium of claim 9.

11. The non-transitory computer-readable medium of claim 10, wherein the functions further comprise, after processing the submitted print job file using the at least one submitted print instruction in the submitted print ticket, deleting, from the hot folder, both the submitted print ticket and the submitted print job file referenced in the submitted print ticket.

12. The non-transitory computer-readable medium of claim 10, wherein the submitted print job file is stored at a remote location, and wherein the submitted print ticket includes a reference to the remote location, the method further comprising downloading the submitted print job file from the remote location.

13. The non-transitory computer-readable medium of claim 10, wherein each respective corresponding delay timer selected for each of the plurality of submitted files has an associated specified delay time period that is long enough to allow both the submitted print ticket and the submitted print job file to be saved to the hot folder.

14. The non-transitory computer-readable medium of claim 9, wherein the print job comprises a plurality of submitted print job files associated with the submitted print ticket, and wherein the respective corresponding delay timer is applied as a shared timer to the plurality of submitted print job files.

15. The non-transitory computer-readable medium of claim 9, wherein each of the plurality of delay timers has an associated filter pattern.

16. The non-transitory computer-readable medium of claim 15, wherein the associated filter pattern for each of the plurality of delay timers evaluates at least one of the following for each of the plurality of submitted files: (a) a file name or (b) print job metadata.

17. A printing device comprising:
   a print controller comprising at least one processor; and
   a non-transitory computer-readable medium having instructions stored therein to cause the at least one processor to perform functions on behalf of the printing device to process a print job, the functions comprising:
      receiving, at a hot folder that processes print job files according to default print instructions associated with the hot folder, a plurality of submitted files, wherein the plurality of submitted files includes at least (a) a submitted print job file and (b) a submitted print ticket, wherein the submitted print ticket includes at least one submitted print instruction;
      selecting a respective corresponding delay timer for each of the plurality of submitted files received at the hot folder, wherein the corresponding delay timer for each of the plurality of submitted files is selected from among a plurality of delay timers specified for the hot folder, wherein each of the plurality of delay timers has a respective delay timer definition selected from at least a first delay timer definition and a second delay timer definition that differs from the first delay timer definition, and wherein the first delay timer definition and second delay timer definition each specify a respective delay time period and at least one hot folder to which the respective delay timer applies;
      upon receiving each of the plurality of submitted files, starting the respective corresponding delay timer for the received submitted file in the plurality of submitted files;
      waiting to process each of the plurality of submitted files by delaying processing each of the plurality of submitted files until the respective corresponding delay timer of the plurality of delay timers has expired by decrementing to zero; and
      upon expiration of the respective corresponding delay timer, processing the submitted file corresponding to the expired respective corresponding delay timer by applying the (a) default print instructions or (b) the at least one submitted print instruction from the submitted print ticket to the submitted print job file and printing the submitted print job according to (a) the default print instructions associated with the hot folder or (b) the submitted print instructions.

18. The printing device of claim 17, wherein the submitted print ticket includes a reference to the submitted print job file.

19. The printing device of claim 18, wherein the functions further comprise, after processing the submitted print job file using the at least one submitted print instruction in the submitted print ticket, deleting, from the hot folder, both the submitted print ticket and the submitted print job file referenced in the submitted print ticket.

20. The printing device of claim 17, wherein each of the plurality of delay timers has an associated filter pattern to evaluate at least one of the following for each of the plurality of submitted files: (a) a file name or (b) print job metadata.

* * * * *